United States Patent
Downey et al.

[11] Patent Number: 6,145,914
[45] Date of Patent: Nov. 14, 2000

[54] TORQUE TUBE FOR SEAT TRACK ASSEMBLY

[75] Inventors: Hugh D. Downey, Barrie; Pascal Garrido, Gravehurst; Roger Freund, Port Sydney, all of Canada; Nills O. Olsson, Glen Ellyn, Ill.; Gregory David Collins, Gravenhurst, Canada

[73] Assignee: Dura Global Technologies Inc., Rochester Hills, Mich.

[21] Appl. No.: 09/207,128

[22] Filed: Dec. 8, 1998

[51] Int. Cl.[7] .............................. B60N 2/02; F16M 13/00
[52] U.S. Cl. ..................... 296/65.18; 296/65.05; 248/429; 248/430
[58] Field of Search .............................. 296/65.18, 65.05, 296/65.08; 248/429, 430; 297/311, 313, 325, 344.11, 344.15

[56] References Cited

U.S. PATENT DOCUMENTS

| | | | |
|---|---|---|---|
| 3,930,632 | 1/1976 | Shigeta et al. | 248/429 |
| 4,275,914 | 6/1981 | Holweg et al. | 248/429 |
| 5,094,420 | 3/1992 | Aihara et al. | 248/430 |
| 5,106,144 | 4/1992 | Hayakawa et al. | 296/65.05 |
| 5,176,353 | 1/1993 | Aihara et al. | 248/430 |
| 5,267,717 | 12/1993 | Isomura | 248/430 |
| 5,280,987 | 1/1994 | Miller | 296/65.1 |
| 5,481,941 | 1/1996 | Premji | 248/430 |
| 5,483,853 | 1/1996 | Moradell et al. | 248/429 |
| 5,765,798 | 6/1998 | Isomura | 248/430 |
| 5,769,377 | 6/1998 | Gauger | 248/430 |
| 5,791,622 | 8/1998 | Gauger | 248/430 |
| 5,816,555 | 10/1998 | Ito et al. | 248/430 |
| 5,941,495 | 8/1999 | Bauer et al. | 248/430 |
| 6,000,757 | 12/1999 | Sovis | 248/430 |
| 6,007,039 | 12/1999 | Olsson et al. | 296/65.18 |
| 6,012,695 | 1/2000 | Bauer et al. | 248/430 |

Primary Examiner—Joseph D. Pape
Assistant Examiner—Kiran Patel
Attorney, Agent, or Firm—Robert K. Roth

[57] ABSTRACT

A vehicle seat assembly includes a seat bottom and a seat back supported for movement relative to the seat bottom such that seat position can be adjusted forwardly or rearwardly with respect to the vehicle. The seat assembly is mounted to a vehicle structure and includes a first track and a second track supported for movement relative to the first track with the seat bottom being supported on the second track for movement with the second track. An actuator selectively controls the movement of the second track with respect to the first track. The assembly also includes at least one torque tube for providing vertical seat adjustment. The torque tube presents a bearing surface for rotatably supporting a bearing surface located on the second track.

18 Claims, 3 Drawing Sheets

TORQUE TUBE FOR SEAT TRACK ASSEMBLY

BACKGROUND OF THE INVENTION

This invention relates to seat adjuster for a seat track assembly with a unique torque tube mounting configuration, specifically, the torque tube includes a bearing surface that rotatably engages a bearing surface on one of the seat tracks.

Seat adjusters are often used in seat assemblies for selectively adjusting the position of a vehicle seat. Typically a first track member is fixed to a vehicle structure, such as a floor, and a second track member is supported on the first track member for movement relative to the first track member such that the seat position can be adjusted forwardly or rearwardly with respect to the vehicle. The adjustment of the seat assembly is controlled by either a mechanical actuator, an electrical actuator, or an electromechanical actuator.

Typically, vertical seat adjustment is accomplished by torque tubes that actuate a drive link assembly that is connected to a seat bottom. An input is provided to the torque tube which rotates causing the drive links to move the seat bottom between a raised and lowered position. These torque tubes are connected to a torque tube bracket that is connected to the second track member.

Mounting the torque tubes in this configuration can cause the seat to be somewhat unstable. Also, these known seat adjustment assemblies are complex requiring a significant number of parts that require a great deal of packaging space, and which make the assembly expensive.

Thus, it is desirable to have a seat adjustment assembly with a torque tube mounting configuration that improves seat stability and reduces the overall number of parts, It is also desirable to have a seat adjustment assembly that provides sufficient strength with fewer parts so that assembly cost and overall assembly weight can be reduced, and available packaging space for other components is increased.

SUMMARY OF THE INVENTION

In a disclosed embodiment, a seat mounting assembly includes a first track defining a longitudinal axis and a second track including a first bearing surface. The first track is mounted to a vehicle structure and the second track is supported for linear movement relative to the first track along the longitudinal axis. The assembly further includes at least one torque tube for providing vertical seat adjustment. The torque tube has a second bearing surface that rotatably supports the first bearing surface.

In one embodiment, the torque tube defines a horizontal axis that is transverse to the longitudinal axis and the mounting assembly includes first and second bearing assemblies for slidably supporting the second track with respect to the first track. The first bearing assembly is located above the horizontal axis and the second bearing assembly is located below the horizontal axis.

The subject invention provides a simplified torque tube mounting configuration for a seat adjuster that is durable, easily installed, easily maintained, and is inexpensive. These and other features can be understood from the following specification and drawings.

DETAILED DESCRIPTION OF THE PREFERRED EMBODIMENT

Figure 1:
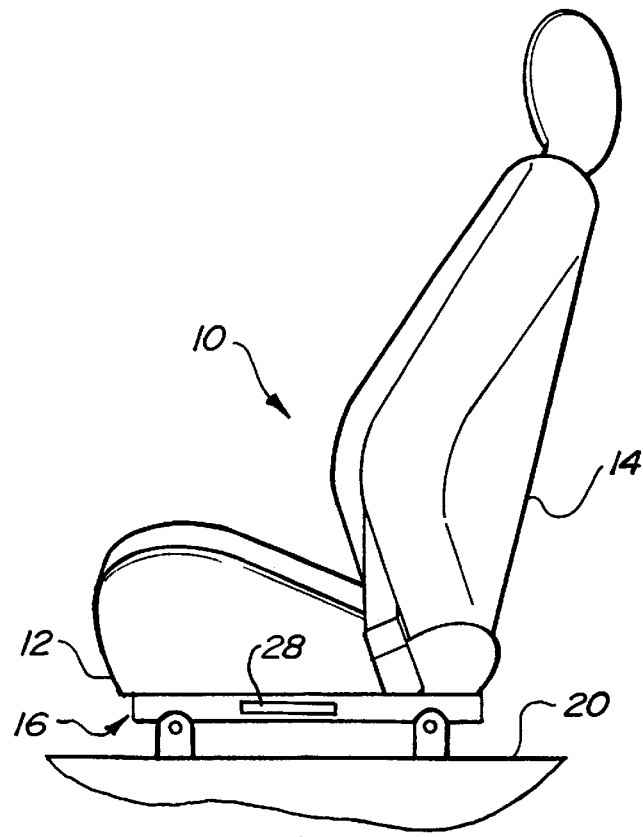
FIG. 1 is a side schematic view of a seat assembly incorporating the inventive torque tube configuration.

A vehicle seat assembly 10, shown in FIG. 1, includes a seat bottom 12 and a seat back 14 supported with respect to the seat bottom 12. A seat mounting assembly 16 is used to mount the seat assembly 10 to a vehicle structure 20, such as a floor. An actuator 28 is used to adjust the position of the seat 10. The adjustment of the seat assembly can be controlled by either a mechanical actuator, an electrical actuator, or an electro-mechanical actuator.

Figure 2:
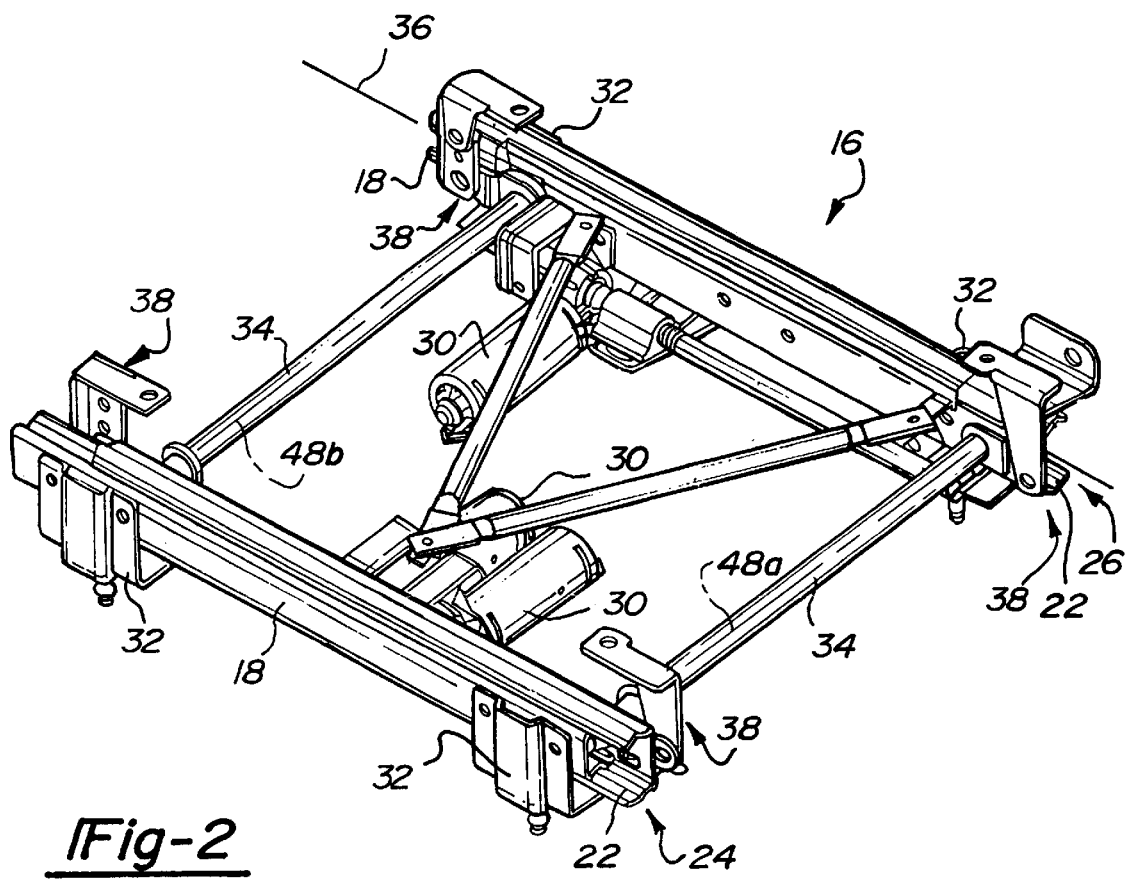
FIG. 2 is a perspective view of a seat track assembly incorporating the inventive torque tube configuration.

The seat mounting assembly 16 includes a first track 18 that is mounted to the vehicle structure 20 and a second track 22 that slides with respect to the lower track 18, as shown in FIG. 2. The tracks 18, 22 define a longitudinal axis 36. The second track 22 moves with respect to the first track 18 along the longitudinal axis.

The seat bottom 12 is supported on the second track 22 for movement with the second track 22 for seat adjustment between forward or rearward positions. Preferably, the first track 18 is an outer or lower track that is mounted to the vehicle floor and the second track 22 is an inner or upper track that slides along the first track 18, however, it should be noted that the terms inner, outer, forward, rearward, upper, and lower, as used in this description, are for illustration purposes only and cannot be considered limiting.

The mounting assembly 16 includes track assemblies on an inboard side 24 and an outboard side 26 of the seat assembly 10. The actuator 28, shown in FIG. 2, is used by a seat occupant for selectively providing input to the mounting assembly 16 to control the movement of the second track 22 with respect to the first track 18. The actuator 28 preferably is an electrical switch assembly that actuates various electrical motors 30 to move the seat back 14 and seat bottom 12 between a variety of seat positions. The actuator can control horizontal seat position, vertical seat position, and/or the angular position of the seat back 14 relative to the seat bottom 12. The actuator 28 is operably connected to both the inboard 24 and outboard 26 track assemblies. The terms inboard and outboard are used in this description for clarity and illustration purposes only and cannot be considered limiting.

Brackets 32 are used to mount the first track 18 to the vehicle floor on both the inboard 24 and outboard 26 sides. Vertical seat adjustment is accomplished by torque tubes 34 that extend from inboard track assembly 24 to the outboard track assembly 26. At least one torque tube 34 is needed to adjust the position of the seat 10 between raised and lowered positions, however, preferably two (2) torque tubes 34 are used for vertical seat adjustment. Preferably, one torque tube 34 is located near the front of the seat 10 and one torque tube 34 is located near the rear of the seat 10. The torque tubes 34 work together to raise and lower the seat 10 upon receipt of input from the actuator 28. A drive link assembly 38 is supported on the torque tubes 34 and is connected to the seat bottom 12 or seat pan.

Figure 3:
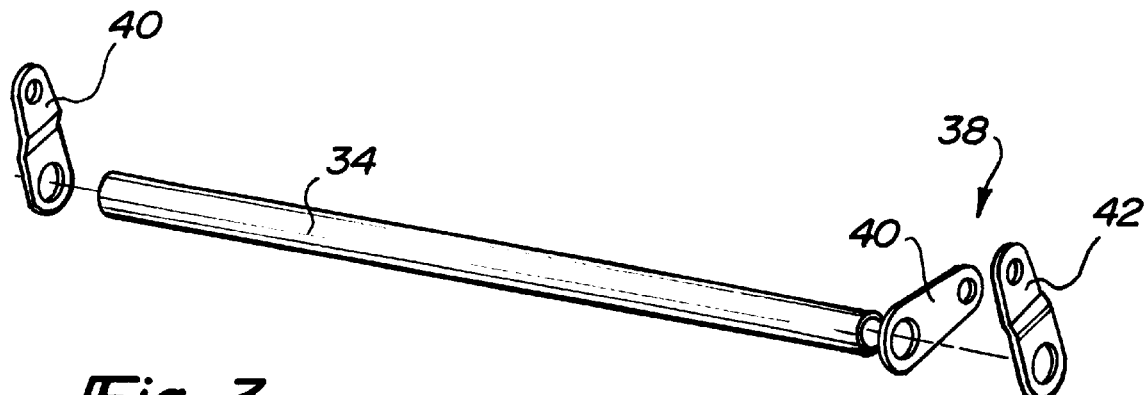
FIG. 3 is an exploded view the torque tube assembly shown in FIG. 2.

The front torque tube assembly 34 is shown in greater detail in FIG. 3. The drive link assembly 38 includes a first link 40 that is fixed for rotation with the torque tube 34. A second link 42 is connected to the first link 40 at one end and is connected to a seat bottom bracket or other mounting structure at the other end. When the torque tube 34 receives input from the actuator 28 it rotates, causing the first link 40 to rotate. As the first link 40 rotates the second link 42 also moves resulting in the seat bottom 12 moving in either an upward or downward direction.

Figure 4:
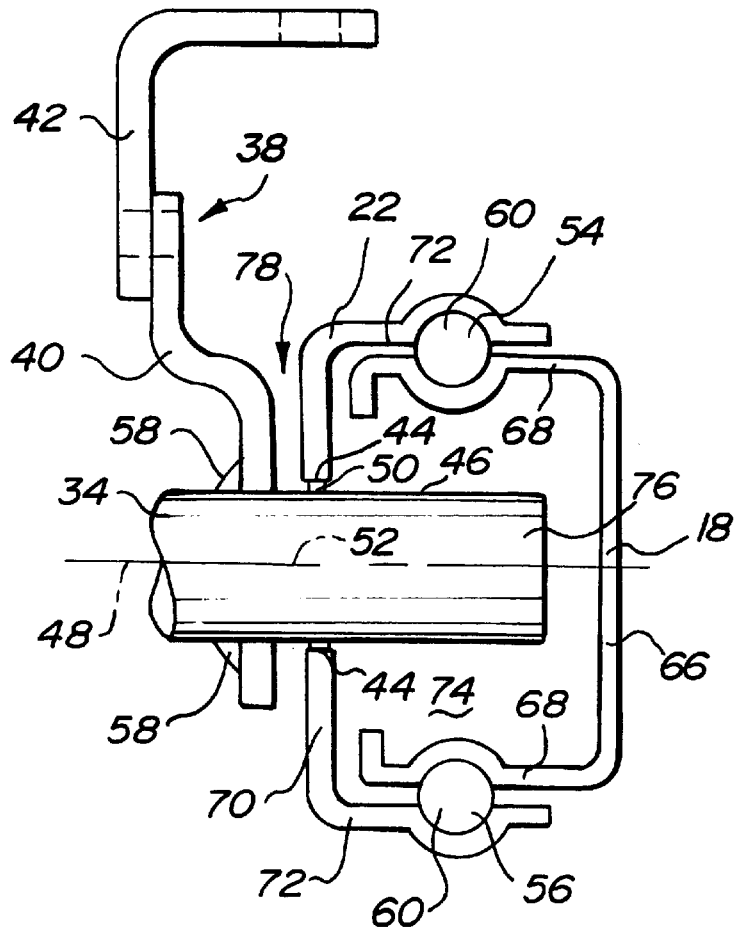
FIG. 4 is a front cross-sectional view of one embodiment of a seat track and torque tube assembly.

A cross-sectional view of the torque tube 34 installed within the mounting assembly 16 is shown in FIG. 4. The second track 22 includes a first bearing surface 44. The torque tube 34 presents a second bearing surface 46 that rotatably engages the first bearing surface 44. The torque tube 34 is preferably a cylindrical member having an exterior surface that defines the second bearing surface 46.

The torque tube 34 defines a horizontal axis 48 that is transverse to the longitudinal axis 36. The first bearing surface 44 is defined by an opening 50 in the second track 22 that has a center 52 located along the horizontal axis 48. The first bearing surface 44 is presented about the periphery of the opening 50. The opening 50 is a generally circular aperture defining a center 52 that is concentric with torque tube 34. Thus, the torque tube 34 is inserted through the opening 50 in the second track 22 and the edges of the opening 50 serve as a bearing surface 44 that engages the bearing surface 46 on the torque tube 34.

As discussed above, the preferred mounting assembly 16 includes a pair of torque tubes 34. The front torque tube 34 defines a first horizontal axis 48a and the rear torque tube defines a second horizontal axis 48b, shown in FIG. 2. The first 48a and second 48b horizontal axes are generally parallel to one another and are both transverse to the longitudinal axis 36.

First 54 and second 56 bearing assemblies slidably support the second track 22 with respect to the first track 18. Preferably, the first bearing assembly 54 is located above the horizontal axis 48 and the second bearing assembly 56 is located below the horizontal axis 48. The first 54 and second 56 bearing assemblies are preferably comprised of a plurality of ball bearings 60 that provide smooth sliding capability between the tracks 18, 22. The vertical orientation of the tracks 18, 22 with the bearing assemblies 54, 56 being located vertically with respect to one another, allows the torque tube 34 to be inserted directly into the second track 22. This eliminates the necessity for torque tube mounting brackets and fasteners and makes the seat adjuster much more compact and cost effective.

The torque tube 34 is preferably welded at 58 to the first link 40 of the drive link assembly 38, however other joining methods known in the art including forming could be used to attach links to the torque tube. As the bearing surface 46 of the torque tube 34 rotates against the bearing surface 44 of the second track 22, the link 40 rotates with the torque tube 34 to adjust the vertical position of the seat 10.

A gap 78 is shown between the link 40 and the second track 22. A bracket or other mounting structure can be supported on the torque tube 34 in this gap 78, or the link 40 could be flush against the second track 22.

Figure 5:
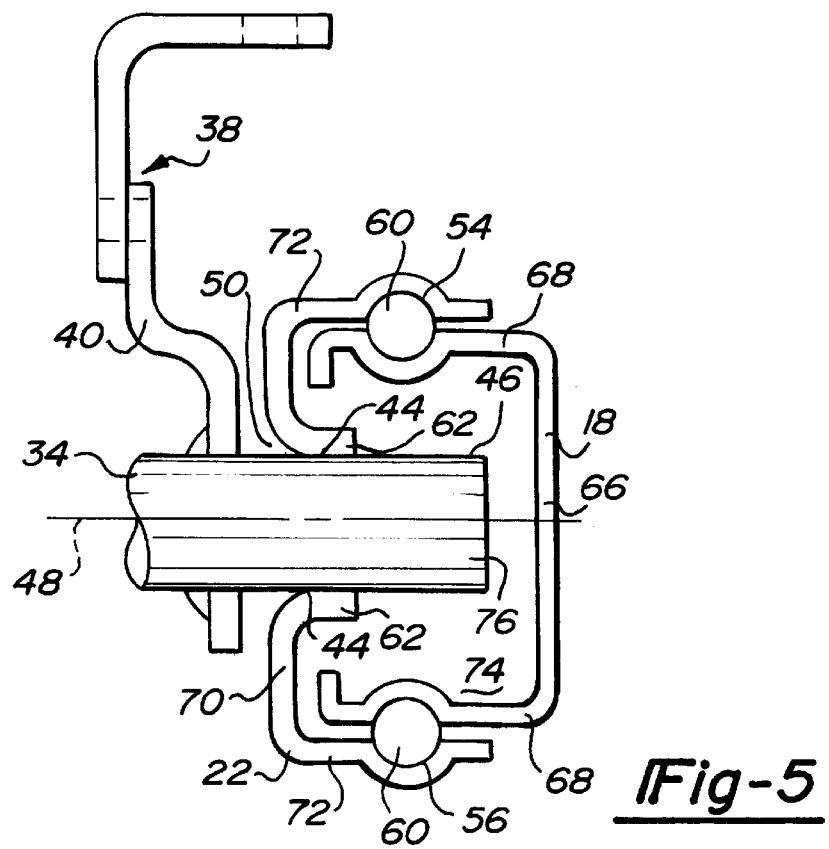
FIG. 5 is a front cross-sectional view of an alternate embodiment of a seat track and torque tube assembly.

An alternate embodiment of the opening 50 in the second track 22 is shown in FIG. 5. The opening 50 can be an extruded opening having leg portions 62 extending inwardly toward the first track 18. The first bearing surface 44 is presented about the periphery of this opening 50 and has an increased first bearing surface area due to the leg portions 62.

Figure 6:
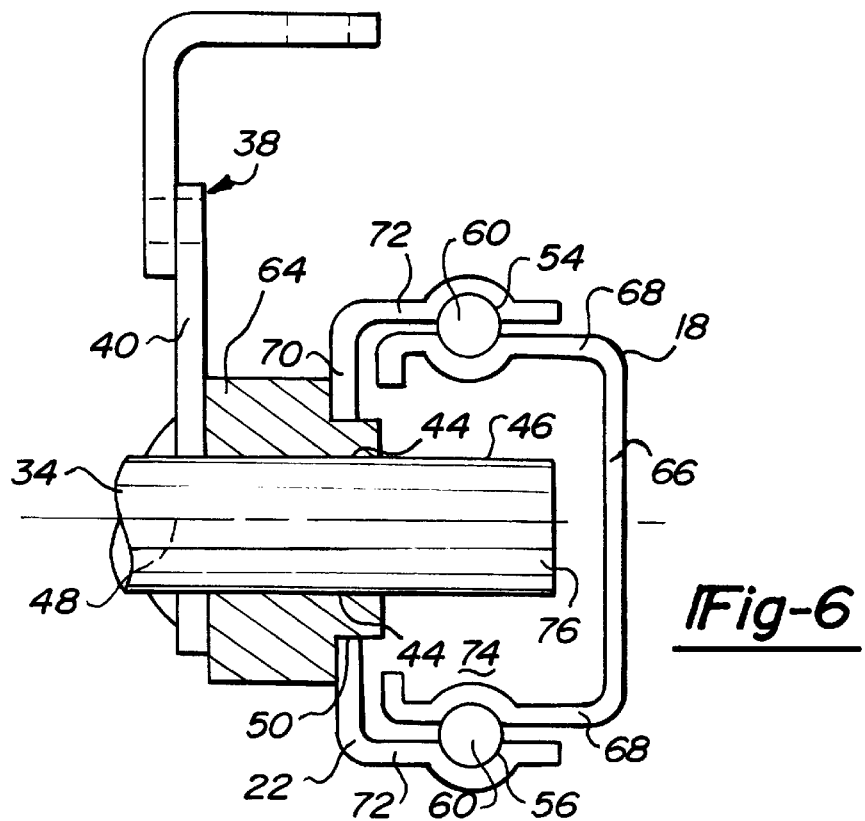
FIG. 6 is a front cross-sectional view of an alternate embodiment of a seat track and torque tube assembly.

An alternate embodiment of the torque tube 34 mounting configuration is shown in FIG. 6. In this embodiment the first bearing surface 44 is an interior surface of a bushing 64. The bushing 64 is inserted through the opening 50 in the second track 22. Thus, the torque tube 34 rotates within the bushing 64 as the torque tube 34 receives input from the actuator 28.

In each of the disclosed embodiments shown in FIGS. 4–6, the first track 18 includes a first base 66 and first pair of legs 68 and the second track 22 includes a second base 70 and a second pair of legs 72. The first track 18 is supported relative to the second track 22 such that first 66 and second 70 bases are opposite from one another with the first pair of legs 68 extending toward the second base 70 and the second pair of legs 72 extending toward the first base 66 to form and interior space 74 between the first 18 and second 22 tracks.

One end 76 of the torque tube 34 is partially received within this interior space 74. Mounting the torque tubes 34 of the mounting assembly 16 in this position eliminates torque tube mounting brackets and other fastening components and provides for a more compact mounting assembly 16. This mounting configuration also reduces cost and increase available packaging space for other seat components.

Preferred embodiments of this invention have been disclosed, however, a worker of ordinary skill in the art would recognize that certain modifications would come within the scope of this invention. For that reason the following claims should be studied to determine the true scope and content of this invention.

We claim:

1. An assembly for mounting a seat within a vehicle comprising, in combination:

a first track mounted to a vehicle structure and defining a longitudinal axis;

a second track supported for movement relative to said first member along said longitudinal axis, said second track having a first bearing surface defined by an edge of an opening, and also having an extruded opening extending inwardly toward said first track, said first bearing surface being presented about a periphery of said opening; and at least one torque tube for providing vertical seat adjustment, said torque tube extending into said opening and presenting a second bearing surface for rotatably supporting said first bearing surface.

2. An assembly as recited in claim 1 wherein said torque tube defines a horizontal axis that transverse to said longitudinal axis.

3. An assembly as recited in claim 2 wherein said first bearing surface is defined by the opening in said second track having a center located along said horizontal axis, said first bearing surface being presented about the periphery of said opening.

4. An assembly as recited in claim 3 wherein said opening is a generally circular aperture defining a center that is concentric with torque tube.

5. An assembly as recited in claim 2 including a first and second bearing assemblies for slidably supporting said second track with respect to said first member, said first bearing assembly being located above said horizontal axis and said second bearing assembly being located below said horizontal axis.

6. An assembly as recited in claim 5 wherein said first and second bearing assemblies are comprised of a plurality of ball bearings.

7. An assembly as recited in claim 1 wherein said first bearing surface is an interior surface of a bushing, said bushing being supported on second member.

8. An assembly for mounting a seat within a vehicle comprising, in combination:
- a first track mounted to a vehicle structure and defining a longitudinal axis;
- a second track supported for movement relative to said first track along said longitudinal axis, said second track having a first bearing surface;
- a first torque tube for receiving input from an actuator, said first torque tube presenting a second bearing surface for rotatably supporting said first bearing surface; and
- a drive assembly supported on said first torque tube for providing vertical seat adjustment when said first torque tube rotates due to input from said actuator;
- wherein the first torque tube has an end which extends into an interior space between the first and second tracks.

9. An assembly as recited in claim 8 wherein the first torque tube providing vertical seat adjustment for a front portion of a vehicle seat while a second torque tube provides vertical seat adjustment for a rear portion of the vehicle seat.

10. An assembly as recited in claim 9 wherein the first torque tube defines a first horizontal axis and the second torque tube defines a second horizontal axis, said first and second horizontal axes being generally parallel to one another and transverse to said longitudinal axis.

11. An assembly as recited in claim 10 including a first and second bearing assemblies for slidably supporting said second track with respect to said first track, said first bearing assembly being located above said first and second horizontal axes and said second bearing assembly being located below said first and second horizontal axes.

12. An assembly as recited in claim 8 wherein said first torque tube is a cylindrical member having an exterior surface that defines said second bearing surface.

13. An assembly as recited in claim 8 wherein said first track includes a first base and first pair of legs and said second track includes a second base and a second pair of legs, said first track being supported relative to said second track such that first and second bases are opposite from one another with said first pair of legs extending toward said second base and said second pair of legs extending toward said first base to form the interior space between the first and second tracks.

14. A vehicle seat assembly comprising, in combination:
- a seat bottom;
- a seat back supported relative to said seat bottom;
- a first track defining a longitudinal axis;
- a second track supported for movement relative to said first track and including a first bearing surface, said seat bottom being supported on said second track for movement with said second track along said longitudinal axis;
- an actuator for selectively controlling the movement of said second track with respect to said first track; and
- at least one torque tube for providing vertical seat adjustment, said torque tube presenting a second bearing surface for rotatably supporting said first bearing surface;
- wherein the at least one torque tube has an end which extends into an interior space between the first and second tracks.

15. An assembly as recited in claim 14 wherein said torque tube defines a horizontal axis that is transverse to said longitudinal axis.

16. An assembly as recited in claim 15 including a first and second bearing assemblies for slidably supporting said second track with respect to said first track, said first bearing assembly being located above said horizontal axis and said second bearing assembly being located below said horizontal axis.

17. An assembly as recited in claim 14 wherein said first bearing surface is defined by a leg portion of the second track.

18. An assembly as recited in claim 8 wherein said first bearing surface is defined by a leg portion of the second track extending inwardly toward the first track.

\* \* \* \* \*